Jan. 23, 1940.   E. G. MALPAS   2,187,979
PISTON RING
Filed May 23, 1938

Inventor
Ellis G. Malpas
By Liverance and
Van Antwerp
Attorneys

Patented Jan. 23, 1940

2,187,979

UNITED STATES PATENT OFFICE 2,187,979

PISTON RING

Ellis G. Malpas, Muskegon, Mich., assignor to Sealed Power Corporation, Muskegon, Mich., a corporation of Michigan Application May 23, 1938, Serial No. 209,494

2 Claims. (Cl. 309—44)

This invention relates to piston rings and is primarily concerned with a novel method of applying a wearing and sealing ring of a different and softer composition than the material of the piston ring itself to and in a groove in the piston ring, said groove being located around the outer peripheral portions of the piston rings and between its opposed flat sides. It is another object and purpose of the invention to provide a novel piston ring which in its complete form will have the sealing ring within said groove frictionally held in place against displacement and with narrow recesses between sections of said sealing ring and the walls of the groove, capable of retaining oil to assist in lubrication.

An understanding of the invention, and of the objects and purposes thereof and of the functions obtained thereby, may be had from the following description, taken in connection with the accompanying drawing, in which.

Like reference characters refer to like parts in the different figures of the drawing.

Figure 1:
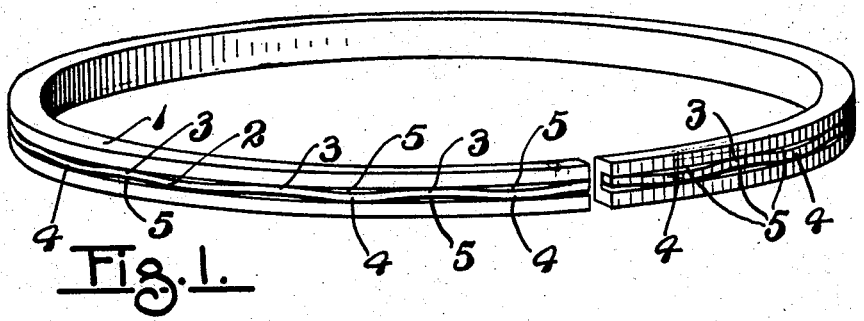
Fig. 1 is a perspective view of a piston ring in accordance with my invention.
Figure 2:
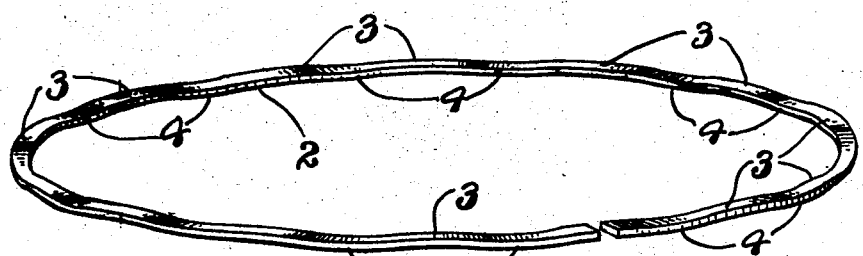
Fig. 2 is a perspective view of the sealing member which is used.
Figure 3:
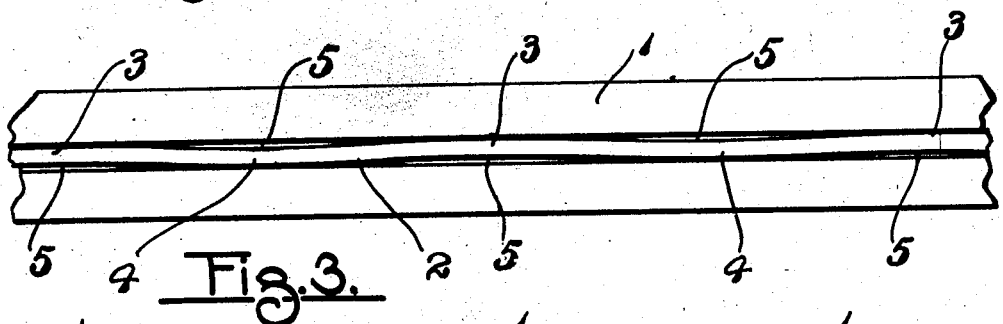
Fig. 3 is an enlarged fragmentary elevation of the ring shown in Fig. 1.

The piston ring 1 is of conventional structure so far as being parted at one side, made from a single individual ring casting, preferably of cast iron material, and with the cross section of the ring substantially uniform throughout. Around this ring in its outer curved side a groove is cut preferably substantially midway between the upper and lower flat sides of the ring. Within this groove the sealing member is adapted to be received and maintained. Said member, indicated at 2, comprises a length of flat material which is formed in succession with alternate elevations and depressions 3 and 4. In other words, the sealing ring is of what may be termed a wavy form. Before the ring is placed in the groove the distance between the highest point of an elevation 3 and the lowest point of a depression 4 is greater than the width of the groove in the piston ring.

The material from which the sealing member 2 is made is softer than that of the cast iron material which is used for the piston ring 1. It may be of brass or copper or of a combination of metals forming a suitable alloy, but preferably softer than the cast iron of the piston ring and also having an inherent springiness, which quality causes it to tend to return to its initial position when deformed or stressed out of such position. Such sealing member inserted in the groove of the piston ring 1 is sprung or flattened in order to conform to the width of the groove and to bring the highest points of the elevations 3 and the lowest points of the depressions 4 closer together than they are normally when free of the ring. Thus the upper portions of the elevations 3 and the lower parts of the depressions 4 will bear with considerable force against the opposite walls of the groove in which the sealing member is located and with a frictional force and resistance to relative movement of the sealing member to the piston ring 1 such that the sealing member is firmly held against change of position in the groove. The spaces 5 between walls of the groove and the bends in the sealing member 2 are shown in considerably exaggerated form in the drawing, but there are such spaces alternately at the upper and lower sides of the sealing member between such sealing member and the walls of the groove in the ring 1. In such spaces or recesses lubricating oil may collect and be retained, which aids in lubricating the piston in its reciprocatory movements in an engine cylinder.

While I have shown the ends of the sealing member 2 coming to the parting in the piston ring, it is of course to be understood that various modifications as to the ends of the sealing member and the parting may be resorted to without departing from the present invention. The ends of the sealing member in no case should extend beyond the ends of the ring 1 at the parting. If such ends of the sealing member terminate a short distance from the ends of the ring at the parting it will not be disadvantageous. Also the groove in which the sealing member is located does not necessarily have to continue to the extreme ends of the ring at the parting but can be stopped short of such ends of the ring and the sealing member correspondingly shortened.

Figure 4:
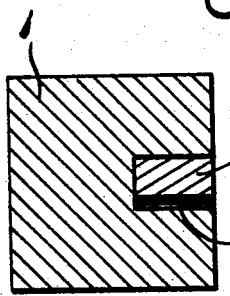
Fig. 4 is a transverse section therethrough.
Figure 5:
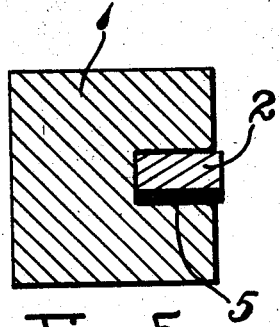
Fig. 5 is a similar transverse section showing a slight modification in structure.
Figure 6:
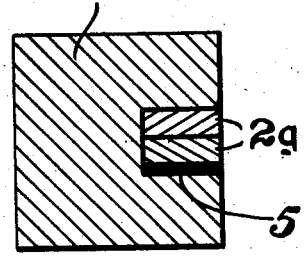
Fig. 6 is a similar cross section illustrating the use of a plurality of said sealing members in the groove.

The sealing member 2 is forced or pressed into the groove of the ring 1 and may have its peripheral portions project a short distance, a few thousandths of an inch beyond the curved surface of the ring, as shown in Fig. 5. And in this form the outer surface portions of the sealing member 2 would be the first to bear against the walls of the cylinder and in a short time wear down flush with the outer curved surface of the ring. Of course also the sealing member may be inserted in the groove of the ring 1 prior to the finishing machining operation at the outer curved surface of the ring and both the ring 1 and the sealing member simultaneously machined so that their outer surfaces are flush with each other as in Fig. 4, instead of the sealing member projecting from the ring as in Fig. 5. Both forms of ring are contemplated by my invention and either is a matter of choice with the manufacturer or the customer who orders the piston rings. In Fig. 6 a plurality of the sealing members 2a are shown in the groove in the ring 1, said sealing members being of the wavy form and nesting one against the other. It is further to be understood that the sharp corners between the outer curved surface of the ring 1 and the walls of the groove in said ring may be rounded or chamfered for an easier entrance of the sealing member into the groove.

In applying the sealing member to the groove it is forced radially inward into the groove by pressure with a flattening of the wavy formed sealing member so that the sealing member may be readily forced into the groove. Under its tendency to return to its original less flat form, a very considerable pressure is exerted by the raises and depressions 3 and 4 of the sealing member against the walls of the groove so as in effect to produce a secure binding engagement and a fit similar to a press fit between the sealing member and the ring groove at the places of contact of said member 2 with the walls of the groove. The oil collecting and retaining spaces at 5 are of value in that the oil collected therein is an aid in lubricating the piston rings operating against the walls of the cylinder. The construction while relatively simple is very practical and useful.

The invention is defined in the appended claims and is to be considered comprehensive of all forms of structure coming within their scope.

I claim:

1. A piston ring comprising, a ring member of cast iron of substantially uniform cross section having a substantially continuous groove in its outer curved side, and a sealing member of softer material located in said groove, said sealing member being of a wavy form with alternate elevations and depressions in its length with the highest points of said elevations and lowest points of the depressions engaging opposite sides of the groove at spaced apart points, and the sealing member being retained in the groove by pressure of said rises and depressions against the wall of the groove.

2. A piston ring comprising, a ring member of cast iron having a substantially continuous groove in its outer curved side, and a sealing member of resilient softer material than the cast iron located in said groove, said sealing member being of less width than the width of the groove and having alternate elevations and depressions in its length, the highest points of said elevations and the lowest points of the depressions engaging opposite sides of the groove at spaced apart points and bearing against said sides of the groove with pressure to thereby retain the sealing member in said groove.

ELLIS G. MALPAS.